Dec. 22, 1942.   S. H. BENJAMIN   2,305,600
SAFETY BLADE MAGAZINE ACCESSORIES
Filed April 15, 1941   9 Sheets-Sheet 1
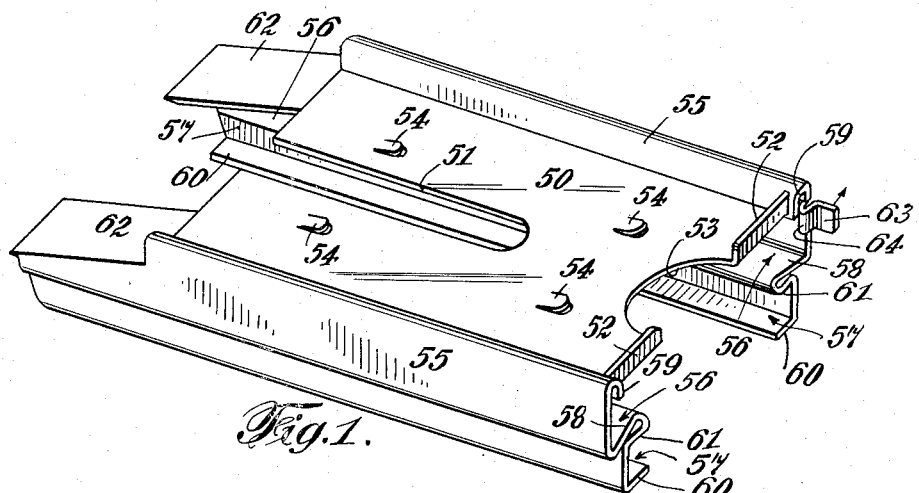
Fig. 1.
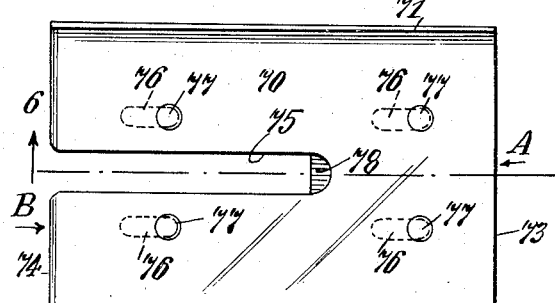
Fig. 2.
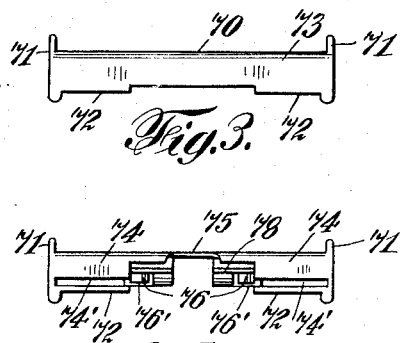
Fig. 3.
Fig. 4.
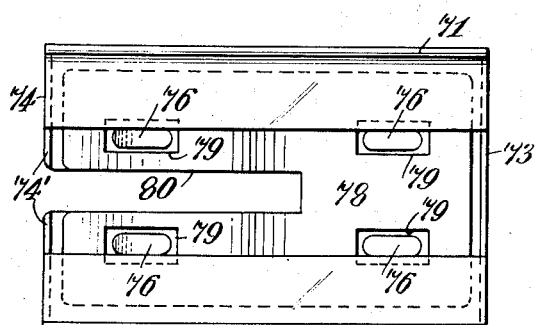
Fig. 5.
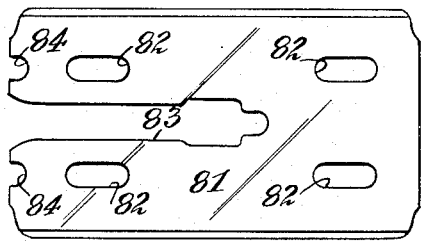
Fig. 7.
Fig. 6.
INVENTOR.
Sidney H. Benjamin
BY
ATTORNEY Dec. 22, 1942.  S. H. BENJAMIN  2,305,600
SAFETY BLADE MAGAZINE ACCESSORIES
Filed April 15, 1941  9 Sheets-Sheet 2

Dec. 22, 1942.                S. H. BENJAMIN                2,305,600
                    SAFETY BLADE MAGAZINE ACCESSORIES
                         Filed April 15, 1941         9 Sheets-Sheet 3

INVENTOR.
BY Sedney H. Benjamin
ATTORNEY

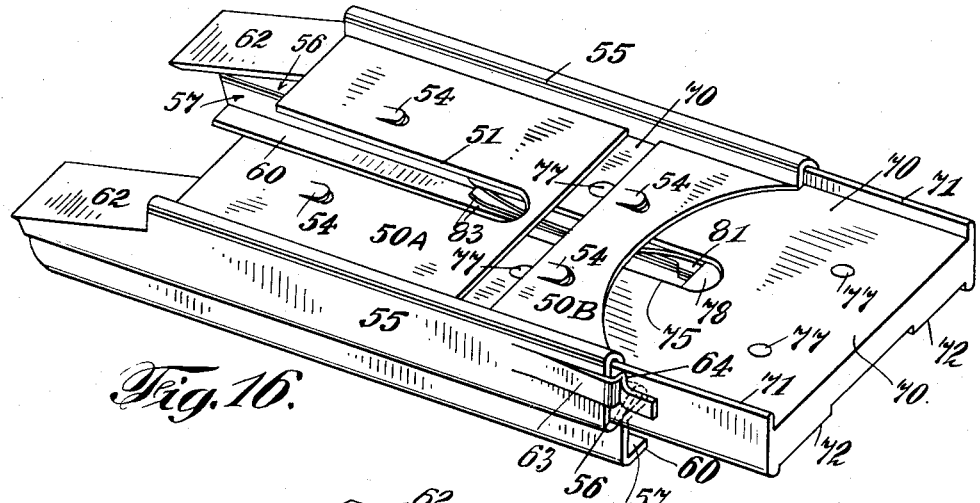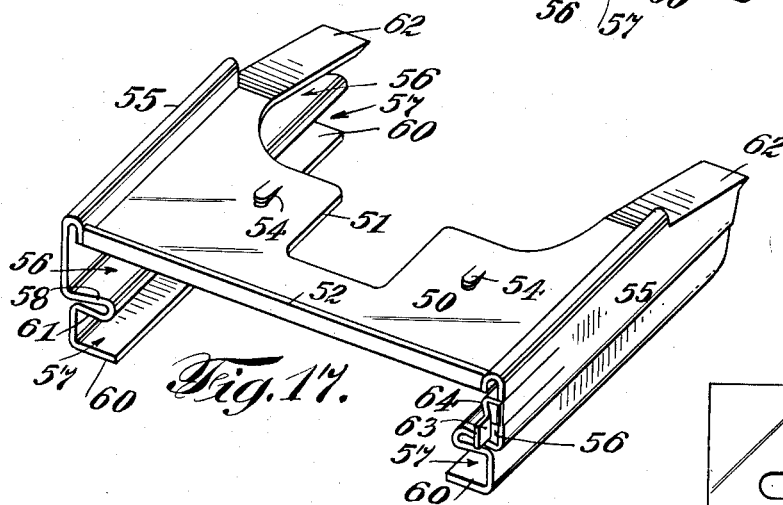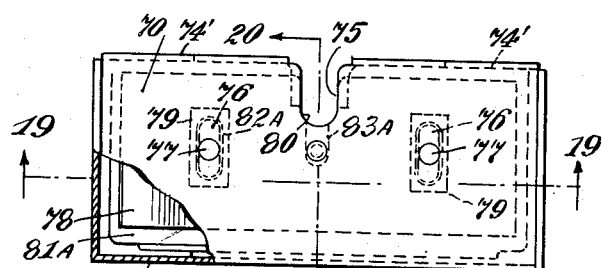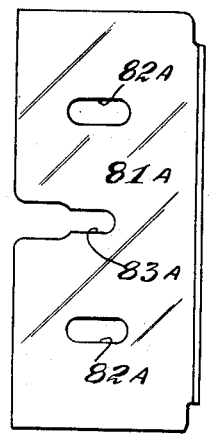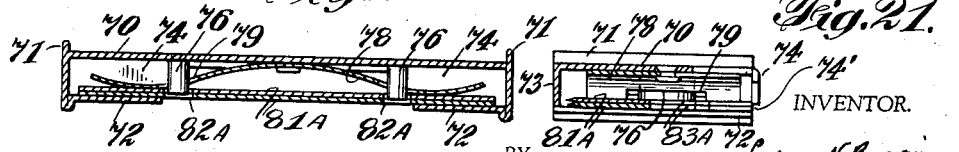

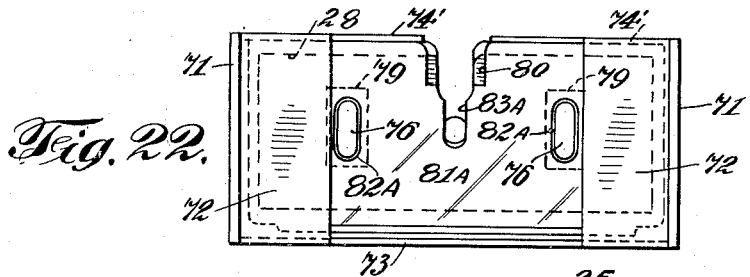
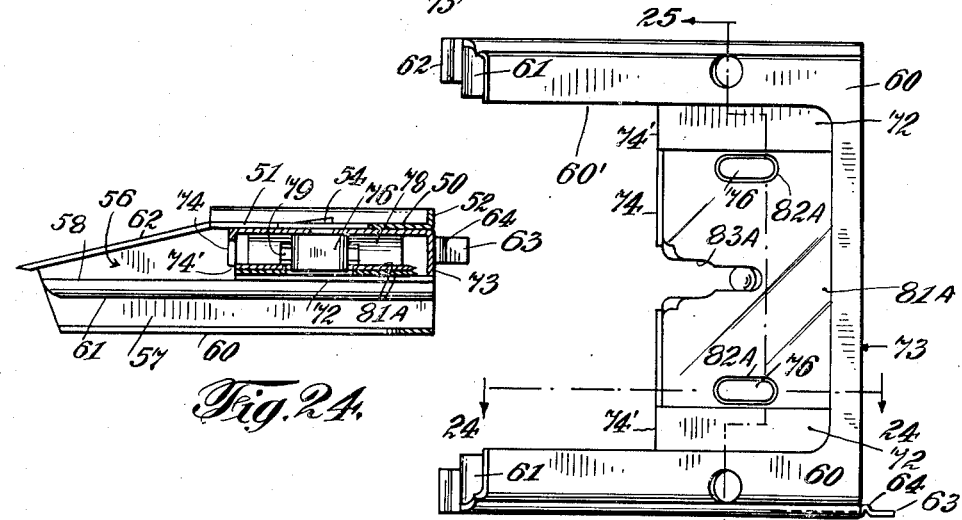
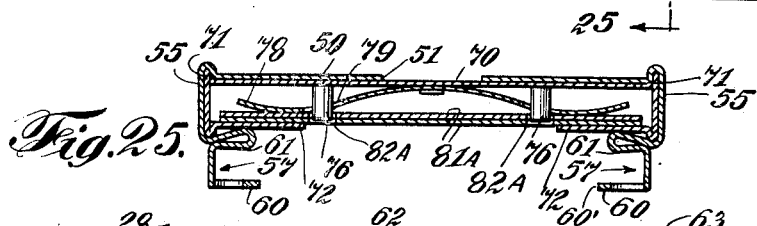
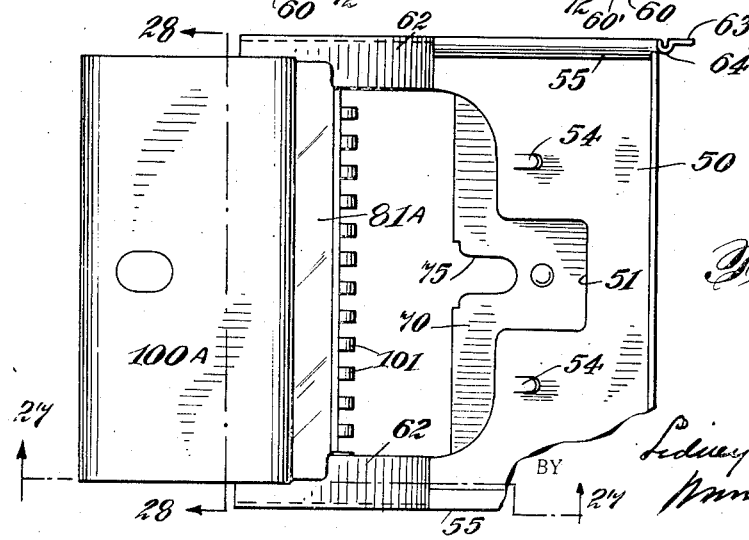

Dec. 22, 1942.　　　　S. H. BENJAMIN　　　　2,305,600
SAFETY BLADE MAGAZINE ACCESSORIES
Filed April 15, 1941　　　9 Sheets-Sheet 6

INVENTOR.
Sidney H. Benjamin
BY
ATTORNEY

Dec. 22, 1942.  S. H. BENJAMIN  2,305,600
SAFETY BLADE MAGAZINE ACCESSORIES
Filed April 15, 1941  9 Sheets-Sheet 7

INVENTOR.
Sidney H. Benjamin
BY
his ATTORNEY

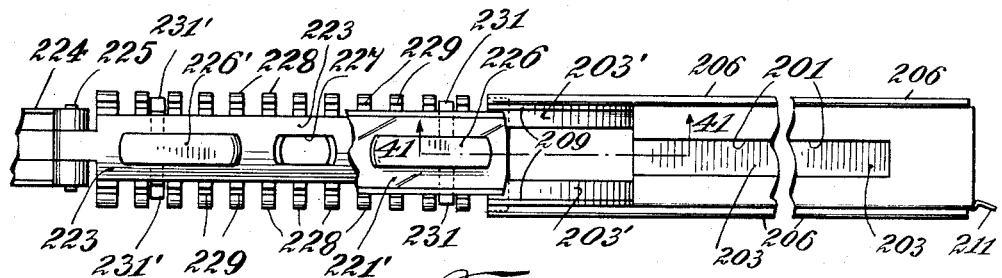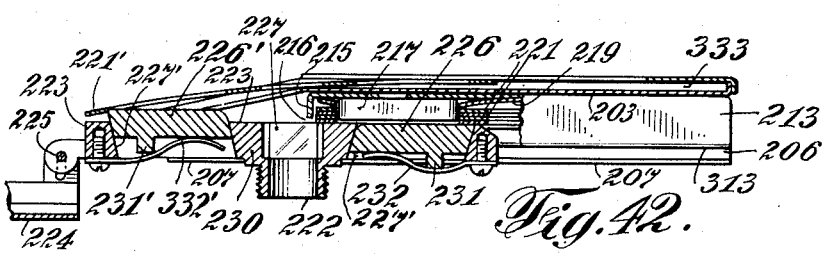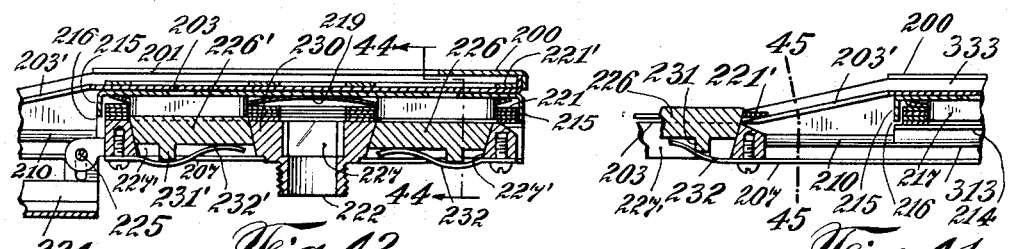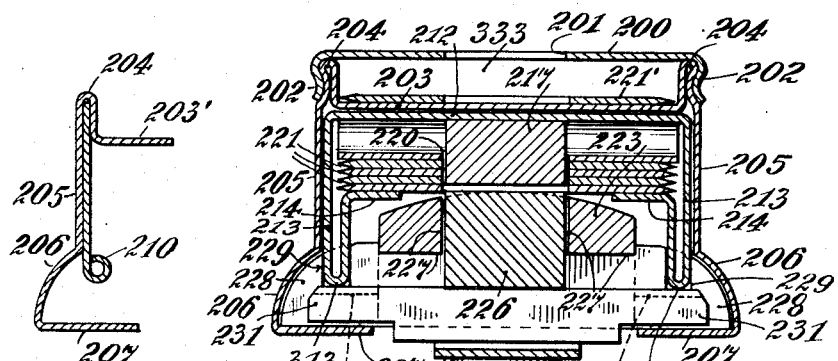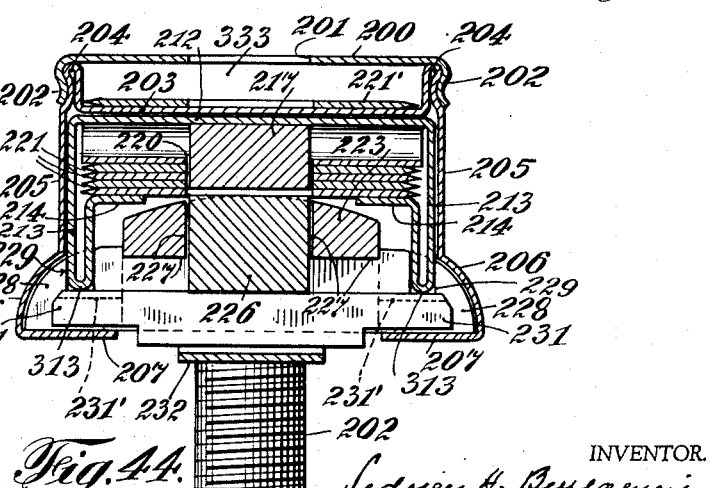

Patented Dec. 22, 1942

2,305,600

UNITED STATES PATENT OFFICE 2,305,600

SAFETY BLADE MAGAZINE ACCESSORIES

Sidney H. Benjamin, Milwaukee, Wis.

Application April 15, 1941, Serial No. 388,617

20 Claims. (Cl. 30—40)

My invention relates to safety razor accessories and refers particularly to devices adapted to co-act with safety razor blade magazines, during the insertion into and withdrawal of blades from a razor head.

The devices of my invention are particularly advantageous in co-operation with razors so constructed as to prevent the removal of a blade from the razor, or the insertion of a blade therein without the use of some special device particularly adapted for that purpose.

Among the devices suitable for the above-mentioned purposes are blade magazines capable of holding a plurality of blades and of such construction that during their reciprocal movements over a razor guard they will remove a previously deposited blade and deposit a new blade thereon.

While it is possible that a blade magazine may be of such construction that it will combine within itself the means for retaining a plurality of blades, means for allowing the removal of a single blade therefrom, means for directing its movement into the razor and means for operating the blade retaining and releasing elements of the razor, the object of the present invention is a device whereby the devices necessary for the accomplishment of these results present new and improved features of considerable value.

Safety razor blades are sold in packages for convenience and in order that the edges may not be dulled or marred during handling, and it is evident, therefore, that the packages containing such blades be as inexpensive as possible while allowing them to accomplish their desired results.

My present invention, therefore, is directed to such devices adapted for the purposes described herein as to allow of their economic cost of production coupled with efficiency of operation.

In order to accomplish the above-mentioned described results, I have devised a simple, inexpensive blade magazine adapted to co-operate with a separate specially devised magazine holder, the latter acting as a means for the introduction of the blade magazine into a razor head for the purpose of depositing a new blade therein and withdrawing an old blade therefrom.

It is evident that a user need purchase only one such holder and that the blade magazines of my invention may be used as re-fills therefor.

It will thus be seen that in the continued employment of the device of my invention, the user is not compelled to buy a combined blade magazine and device for inserting the magazine into a razor head for the purpose of positioning a new blade therein, but need buy only a much less expensive blade magazine and use it as a re-fill for his inserting device.

A further advantage of my device over that of a combined magazine and inserting device, is that the magazine may be removed from the inserting device after each use, and the latter may be thoroughly cleansed without submitting the magazine and its contained blades to the presence of water and soap.

A further advantage of my invention is that the blades are retained in the magazine and can be withdrawn only by the co-operation of my inserting device, thus protecting them from being accidentally removed from the magazine or from being injured by handling.

The foregoing and other valuable features of the devices of my invention will be evident upon a consideration of my specification and its accompanying drawings, in which similar parts are designated by similar numerals.

Figure 1 is a perspective view of one form of a re-fill blade magazine holder adapted for two-edge blades.

Figure 2 is a top view of a blade magazine adapted for use with the holder of Figure 1.

Figure 3 is an end view of Figure 2 in the direction of arrow A.

Figure 4 is an end view of Figure 2 in the direction of arrow B.

Figure 5 is a bottom view of the device of Figure 2.

Figure 6 is a section through the line 6—6 of Figure 2.

Figure 7 is a top view of a razor blade adapted for use in the blade magazine of Figures 2 to 6.

Figure 16 is a perspective top view of a modified form of my re-fill blade magazine holder.

Figure 17 is a perspective top view of a modified form of my re-fill blade magazine holder adapted for one-edge blades.

Figure 18 is a top view of a blade magazine adapted for use with the holder of Figure 17.

Figure 19 is a section through the line 19—19 of Figure 18.

Figure 20 is a section through the line 20—20 of Figure 18.

Figure 21 is a top view of a blade adapted for use with the devices of Figures 17 to 20.

Figure 22 is a bottom view of the blade magazine with blades therein.

Figure 23 is a bottom view of the assembled holder of Figure 17 and the blade magazine of Figure 22.

Figure 24 is a section through the line 24—24 of Figure 23.

Figure 25 is a section through the line 25—25 of Figure 23.

Figure 26 is a fragmentary top view of the holder of Figure 23 with its blade magazine partly inserted into a razor head.

Figure 40 is a top view of a razor and blade magazine holder showing the first step of operation.

Figure 41 is a section through the line 41—41 of Figure 40.

Figure 42 shows the arrangement of parts of Figure 40 during the next step of operation.

Figure 43 shows the full movement of the parts of Figure 40.

Figure 44 is an enlarged section through the line 44 of Figure 43.

Figure 45 is a section through the line 45—45 of Figure 41.

Figure 8:
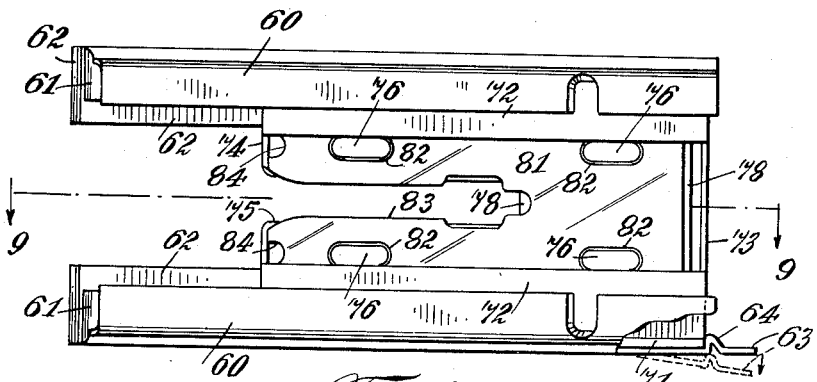
Figure 8 is a bottom view of the afore illustrated holder and magazine with a plurality of blades within the magazine.

The particular form of my refill safety razor blade magazine holder, adapted particularly for use with double-edge blades, for the purposes described herein, as shown in Figures 1 to 15 inclusive, comprises a top member 50, having an elongated recess 51, two upwardly extended rear guards 52—52, a recess 53 between the guards 52—52 and a plurality of upwardly and rearwardly extended blade removing members 54—54. Fixedly attached to the top member 50 are two similar guide side members 55—55, each so constructed as to have two interior superimposed run-ways 56 and 57 extending longitudinally of said guide side members 55—55, the use of which will be later described. The upper run-way 56 is formed by the lower longitudinal member 58 and the upper longitudinal member 59, and the lower run-way 57 is formed by the lower longitudinal member 60 and the upper longitudinal members 61. Each guide side member 55 has a forwardly and downwardly extended entering member 62, the forward end of which is spaced from the upper face of the longitudinal member 61, to allow of the passage of a razor blade between the members 61 and 62 as at 61'. One side member carries a spring controlled stop member 63, the portion 64 of which extends slightly across the end of the run-way 56.

The operation of this device is accompanied by a razor blade magazine of such construction as to allow of the ejection, or removal, of a single blade from a stack of blades carried by the magazine.

One form of a blade magazine adapted for co-operation with the above-described holder device comprises the top member 70, the two-flanged sides 71—71, and the spaced bottom member 72—72. One end is closed by the end member 73, and the other end carries the end members 74—74, one side of each of which is spaced 74' from a bottom member 72 sufficiently to just allow a single blade to pass therethrough. The top member 70 has the longitudinal recess 75. Positioned within the magazine are four retaining lugs 76—76—76—76 attached to the top member 70 by means of the flush rivets 77—77—77—77 and extending downwardly from the top member 70. These lugs extend toward the bottom members 72—72, the free extremity of each lug 76 being spaced from the bottom members 72—72 a distance 76' at least as great as the thickness of a blade and less than the thickness of two blades. A spring 78 having the openings 79—79 for the admission of the lugs 76—76 and a longitudinal recess 80 is positioned between the top member 70 and the bottom members 72—72.

A blade 81 adapted for use with the above described blade magazine and magazine holder and with a particular form of razor head to be described later, has the openings 82—82 for reception of the lugs 76—76, a longitudinal recess 83 corresponding to the recess 75 of the magazine, and two end recesses 84—84.

Figure 9:
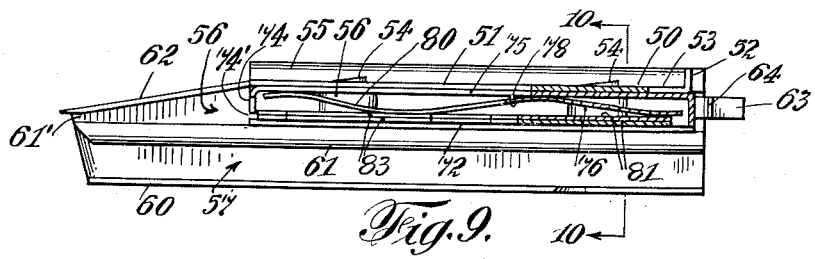
Figure 9 is a section through the line 9—9 of Figure 8.
Figure 10:
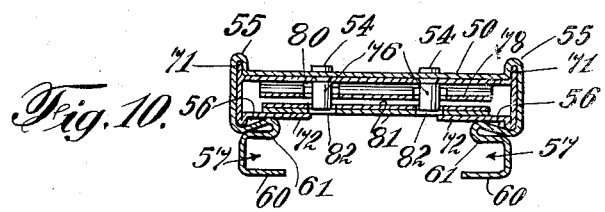
Figure 10 is a section through the line 10—10 of Figure 9.

The blade magazine when ready for use contains a stacked number of blades positioned between the spring 78 and the bottom members 72—72, as shown particularly in Figures 9 and 10, the lowermost blade being spring compressed against the bottom members 72—72 and in alignment with the opening 74'.

In co-ordinating the above described guide magazine holder and the described stacked blade magazine, the magazine is removably carried by the holder by inserting the ends of the two flange sides 71—71 of the magazine at the open end of the magazine, into the two run-ways 56—56 of the holder sides and sliding it fully therein, the catch 63, thus preventing the magazine from reverse movement.

The co-ordinated device is clearly shown in Figures 8, 9 and 10.

The principal object of the described devices is their co-operative action with razor blades in such a manner that the inward and outward passage of the device between a razor head guard and its cover member will remove a used blade therefrom and deposit a new blade in position for shaving, said new blade being automatically withdrawn from the blade magazine.

While my devices are particularly valuable for use with razer heads in which blades cannot be deposited or withdrawn other than by the use of my devices, I do not limit their use to razor heads of that particular construction, and I wish it, therefore, to be understood that my later described descriptions of their applications are given solely for purposes of illustrating some forms of their application.

Figures 11 to 15 illustrate the application of my co-ordinated devices, described herein, to a razor of the character of that shown and described in my United States Patent Number 2,226,964, issued December 31, 1940, although I do not limit their application to this particular form of razor head.

As the said United States patent is of public print and as the operating elements for the removal of an old blade and the deposit of a new blade are clearly described therein, and as such razor is not a part of this invention, it is believed that in describing the application of the devices of this application it is necessary to show and describe only those parts of the patented device as will clearly show the application of the devices herein.

Figure 11:
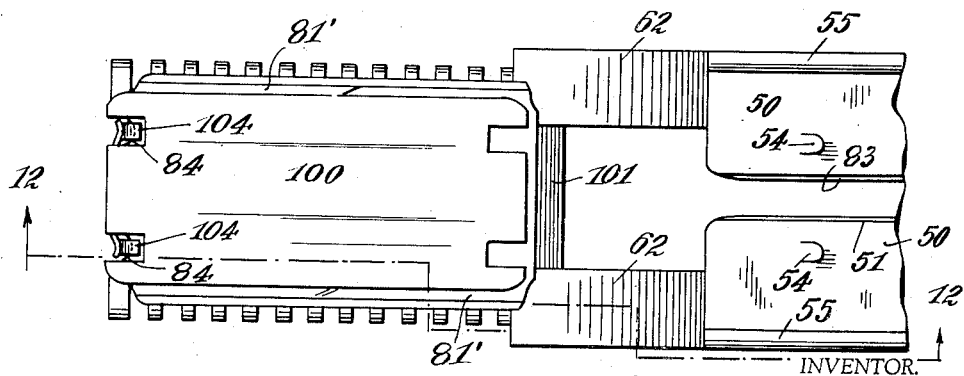
Figure 11 is a fragmentary top view of the first step in introducing the combined devices of Figures 8, 9 and 10 into a razor head.
Figure 12:
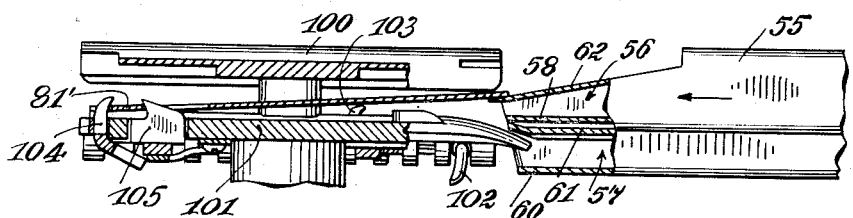
Figure 12 is a section through the line 12—12 of Figure 11.

Figures 11 and 12 illustrate the first step in the application of my devices and comprise raising the cap 100 from abutment upon the positioned blade 81' which it is desirous of removing from the razor. The inclined members 62—62 are inserted between the guard 101 and the blade 81'.

Figure 13:
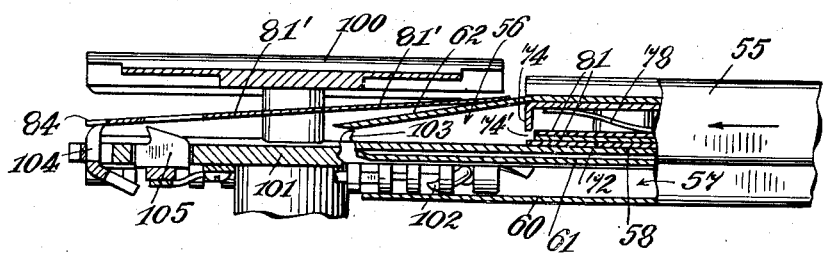
Figure 13 is a vertical cross-section similar to Figure 12 with the devices moved further into the razor head.

Figure 13 illustrates the positions of the elements when the holder is moved longitudinally along the razor head. During this movement the sides of the guard 101 move within the two runways 57—57 of the holder, this movement has depressed the two cams 102—102, and moving the blade retaining member 103 out of contact with the blade 81' allowing it to be released therefrom, the blade 81' being released by the finger members 104—104 from the recesses 84—84 of the blade 81'.

Figure 14:
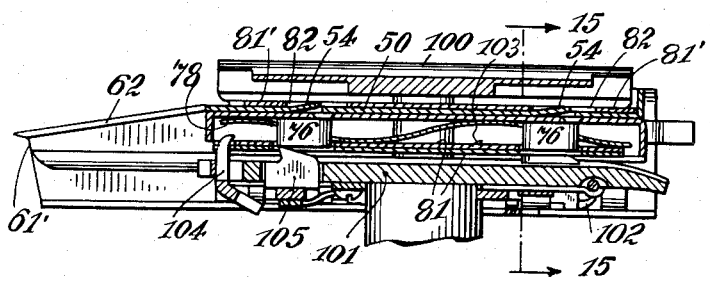
Figure 14 is a vertical cross-section similar to Figure 13 with the devices moved completely into the razor head.
Figure 15:
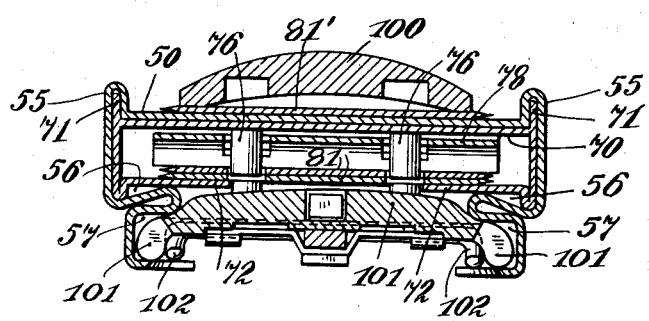
Figure 15 is a section through the line 15—15 of Figure 14.

Figures 14 and 15 illustrate the holder and blade magazine moved completely longitudinally along the razor head. The holder has now moved the vertically movable studs 105—105 downwardly thus withdrawing them from upper retaining contact with the blade 81' which has now been forced to a position of rest upon the top 50 of the holder with the withdrawing members 54—54 positioned within the openings 82—82 of the blade 81 and hence the withdrawal of the holder will withdraw the blade 81.

During the positioning of the elements as shown in Figures 14 and 15, the outermost blade 81 of the stack of blades in the magazine has been carried into the head and is positioned in proper position for shaving and as the holder and magazine are withdrawn the blade retaining members of the head operate to retain this outermost blade within the head, while the remaining blades in the magazine are retained therein.

It will thus be seen that by an introducing movement and a withdrawal movement of my holder and magazine, an old blade is removed from, and a new blade is introduced into and positioned within a razor head.

It will be further noticed that my holder and my magazine are so constructed that a user can retain his holder and introduce blade magazines into it as desired, and hence, as his future purchases are limited to stacked blade magazines, a device of the described character is much more economical than a device in which the holder and magazine are of unitary construction.

The modified form of my holder for a blade magazine containing double edge blades illustrated in Figure 16 is the same as the one previously shown and described except that the top member of the holder is in two sections 50A and 50B instead of in one section 50.

The modified form of my device adapted for single edge blades as illustrated in Figures 17 to 28 is the same as that previously illustrated and described, as is evidenced by the use of the corresponding numerals, except that it is of such dimensions that it allows of the ejection of a blade with the edge directed rearwardly of the device, while in the previously described form, in the ejection of a blade the two edges are directed at right angles to the direction of movement of the device. The bottom member 60 is in one piece, as shown, thus forming a recess 60' therein.

One form of a one edge blade 81A adapted for this blade magazine and holder is shown particularly in Figure 21 and has two openings 82A, 82A and an elongated recess 83A.

The blade magazine employed with this holder is also similar to that shown and described in the prior form, being adapted to hold a plurality of stacked blades, with means whereby the uppermost blade of such stack can be withdrawn from the magazine without the removal of other blades.

Figure 27:
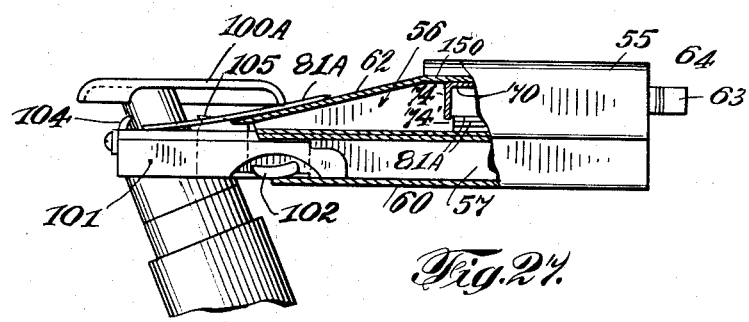
Figure 27 is a section through the line 27—27 of Figure 26.
Figure 28:
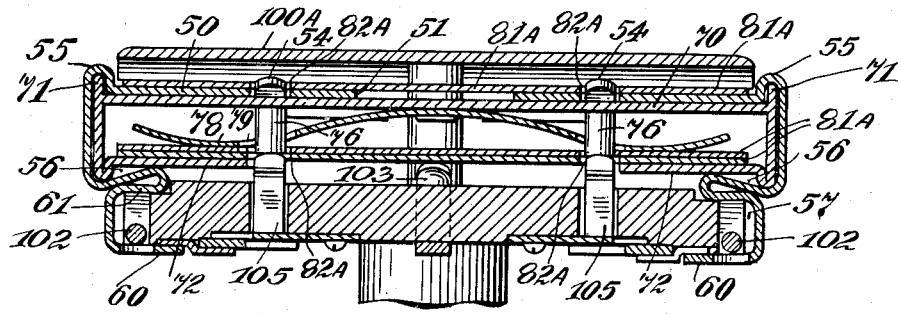
Figure 28 is a section through the line 28—28 of the device of Figure 26 with the holder and blade magazine completely inserted in the razor head.

Figures 26 to 28 illustrate the application of my last described co-ordinated device to a razor of the character of that shown and described in my United States Letters Patent Number 2,226,-964 issued December 31, 1940, although I do not limit its application to this particular form of razor head.

Figures 27 and 28 illustrate the first step in the application of my device and comprises raising the cap 100A from abutment upon the positioned blade 81A. The inclined members 62—62 are inserted between the cap and the blade and moved inwardly, thus causing the blade 81A to ride up over the upper face of the members 62—62.

A complete inward movement of the holder and blade magazine results in combination of these elements with the razor head as shown in Figure 28. The old used blade now rests upon the top 50 of the holder and is held in place thereon by the projections 54—54 which are now positioned through the openings 82A—82A of the blade 81A. The stack of blades in the magazine is now in position upon the guard, and as the holder and magazine are withdrawn, the outermost blade is deposited upon the guard and the remainder are withdrawn.

Figure 29:
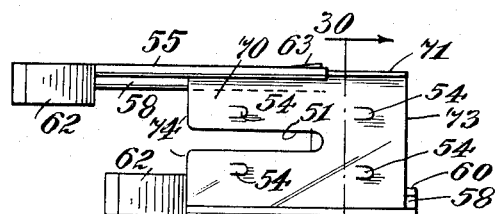
Figure 29 is a top view of a modified form of a re-fill blade magazine.
Figure 30:
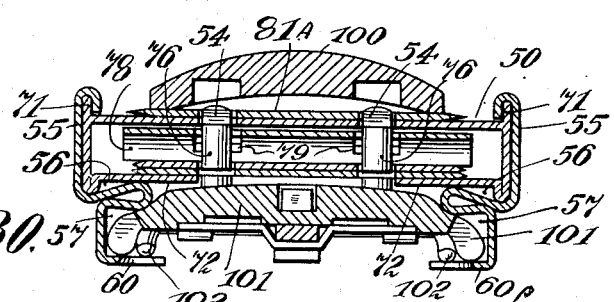
Figure 30 is an enlarged section through the line 30—30 of Figure 29 with the upper guide member pushed in and the holder and magazine completely entered into the razor head of Figure 11.

A modified form of a re-fill blade magazine of my invention is illustrated in Figures 29 and 30.

In this form of my device the two side runner elements 55—55 are not connected by a top member 50 as shown in Figure 1, but are two separate elements.

The re-fill blade magazine, adapted for use with this modified form of holder is similar to that described for use with the holder of Figure 1 except that as there is no top member 50 the blade removing members 54—54 are on the top member 70 of the magazine.

In the use of this form of my holder the two side flange members 71—71 of the magazine are inserted into the runways 56—56 of the side members in the same manner as previously described.

In Figure 30, illustrating the co-operation of this form of holder and magazine with a razor head of United States Letters Patent Number 2,226,964, the relationship is exactly as that shown in Figure 15, except for the differences mentioned.

The modified form of my safety razor blade magazine holder shown in Figures 31 to 45, both inclusive, is particularly adapted for use with narrow double edge blades to be deposited upon and removed from razors having their top members hingedly attached to their guard members, but its application is not limited to razors of the character mentioned.

This modified form of my holder for razor blade magazines comprises a top plate 200 having a longitudinal slot 201 therein. When the holder is to be employed with razors so constructed that there is no centrally, or otherwise, positioned extended member adapted to removably attach the top member to the guard member, thus longitudinal recess may be omitted. The two sides of the top plate 200 are bent downwardly 202 as shown particularly in Figure 44.

Figure 31:
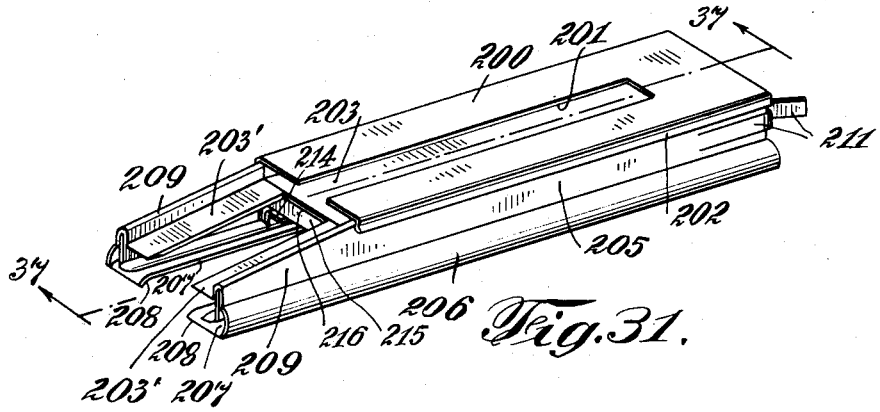
Figure 31 is a perspective view of a modified form of a re-fill blade magazine holder, with a blade magazine therein.
Figure 32:
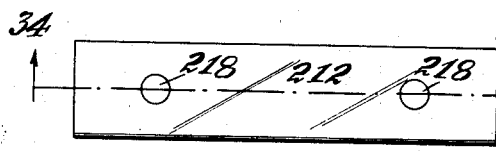
Figure 32 is a top view of the magazine of Figure 31 without blades.
Figure 33:
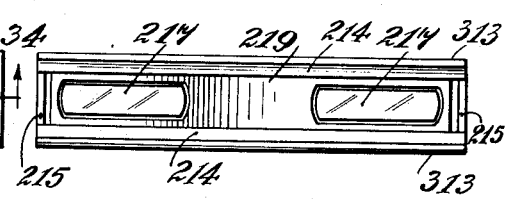
Figure 33 is a bottom view of the magazine of Figure 31 without blades.
Figure 34:
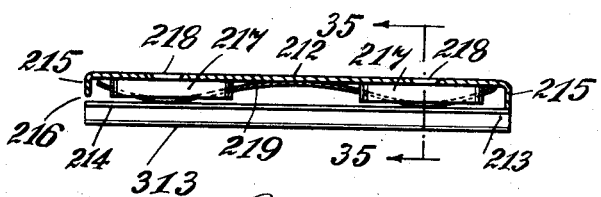
Figure 34 is a section through the line 34—34 of Figure 32.
Figure 35:
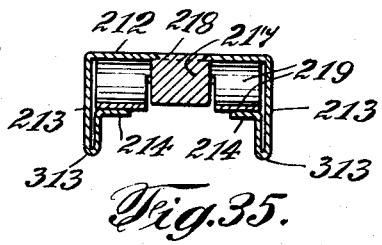
Figure 35 is a section through the line 35—35 of Figure 34.
Figure 36:
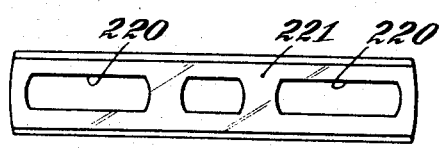
Figure 36 is a top plan view of a blade.
Figure 37:
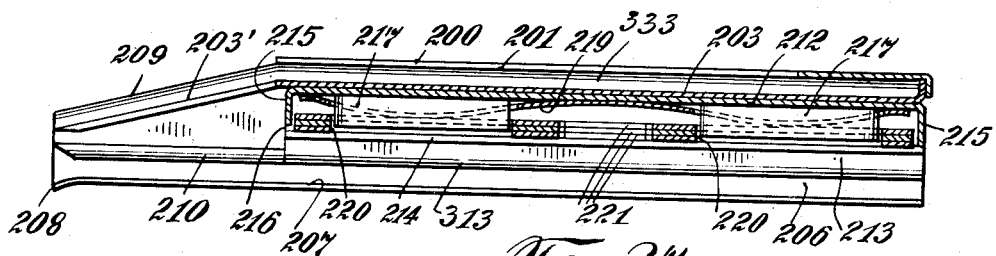
Figure 37 is an enlarged section through the line 37—37 of Figure 31.
Figure 38:
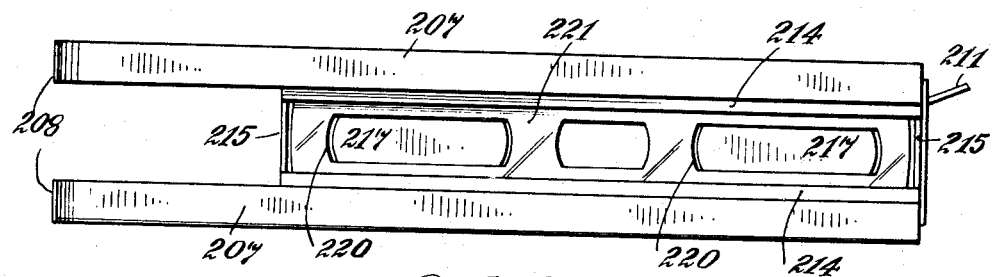
Figure 38 is a bottom view of Figure 37.

The casing of the device comprises a top member 203, having the two extended inclined arms 203'—203', all of which extends upwardly and then downwardly forming the U-shaped member 204, thence downwardly 205 and outwardly 206 and then inwardly forming the two spaced bottom plates 207—207, the extremities 208—208 of which are bent slightly downwardly. The forward end portions 209—209 of the sides 205—205 and the members 206—206 and 207—207 extend beyond the forward ends of the magazine compartment and the upper edges of members 209—209 are inclined downwardly. Fixedly attached to the inner face of the casing member 209 is a blade releasing member 210 to be later described. The rearward portion of the casing, or holder, carries a removal magazine retaining means comprising a cut-out piece 211 from the side and back of the casing and bent as shown in Figure 31, thus preventing the accidental removal of the magazine while allowing of its desired removal.

In the illustrated device the top plate 200 is slidable, but it may be made a fixed element of the device or may be entirely eliminated.

Without limiting myself to any particular form of blade magazine capable of use with my blade magazine holder, Figures 32 to 35 show one form of a blade magazine, the application of which in my blade magazine is shown in some of the other figures.

This particular form of a blade magazine comprises the top member 212, the downwardly extended side members 213—213, the spaced bottom members 214—214 and the end members 215—215 one of which has an opening 216 extending across the end and having a width equal to the thickness of a razor blade within the magazine. Two blades retaining lugs 217—217 are fixedly attached to the under face of the top member 212 by means of two countersunk bolts 218—218. A spring 219, having openings to accommodate the lugs 217—217, has a natural tendency to press a plurality of razor blades toward the bottom members 214—214. A plurality of blades are stacked within the magazine, the lugs 217—217 passing through the openings in the spring 219, and into and through all of the openings 220 in a blade 221, except the bottom one, the height of the lugs 217—217 being less than the distance from the top member 212 to the bottom member 214 by the thickness of a razor blade.

It will, therefore, be noted that it is possible to withdraw the bottom member of the stack through the opening 216, while the remainder of the blades will be retained within the magazine.

Figures 40 to 45 show the application of this particular form of my blade magazine holder to a razor, but I do not limit myself to a razor of this particular construction.

The razor illustrated in these figures comprises a handle-stub 222 for the attachment of a handle, not shown, a guard plate 223 and a cap member 224 shown in part hingedly attached to the guard plate at 225.

The guard plate has a central portion carrying the movable lugs 226—226', and an opening 227 for the insertion of a lug (not shown) carried by the cap member 224, the guard plate has a plurality of extended teeth 228—228 upon both sides of the central portion, each tooth having a recess, or groove 229 therein, said recesses, or grooves, being in alignment with each other.

In describing the elements of the razor, that portion toward the right in the figures will be referred to as the forward portion, while the portion carrying the hinge will be referred to as the rearward portion.

The end faces of the movable lug 226 are inclined forwardly, while the end faces of the movable lug 226' are inclined rearwardly. The inward faces of both lugs 226 and 226' abut upon the inclined faces of the stub element 230 fixedly attached to the guard.

The lugs 226 and 226' consist of the portions extending above the upper face of the guard member, and lower trip members, 231—231' positioned at right angles to the extended portions, said trip members 231—231' extending outwardly from between the teeth 228—228 and above the grooves 229—229. The trip members 231—231' and their upwardly extended members 226—226' are maintained in their upward positions by the springs 232—232' and guided in slots 227'—227' of the guard member 223.

The operations incident to the removal of an old, or previously deposited blade and the insertion of a new blade by means of this form of my razor blade holder into the described razor are shown in Figures 40 to 44 inclusive.

In the first step of operation as shown in Figures 40 and 41, the inclined members 203'—203' have been entered under the old blade 221' which is riding on the upper face of these inclined members, and the first teeth 228—228 have entered the member 206 of the holder, with the trip operating member 210—210 of the holder inserted in the grooves 229—229 of these first teeth.

As the longitudinal movement of the holder proceeds as shown in Figure 42, the trip operating members 210—210 of the holder have moved over the lug members 231—231 pressing them downwardly and thus depressing the lug 226 until it is flush with the guard member thus allowing the new blade 221 to pass over the upper face of the guard member. At the same time the old blade 221' has passed further along the holder members 203'—203' toward the chamber 333.

As the movement of the holder continues, the trip operating members 210—210 reach the lug members 231'—231' but as these lug members are one blade thickness lower at their top surfaces than the lug members 231—231, the lug will not be pushed down until it is flush with the guard face, but extends above the guard face a distance equal to the thickness of the blade. A further movement of the holder, however, causes the blade to ride over the lug 226', thus forcing it flush with the guard face.

When the holder is moved as far as it will go, an opening 220 of the blade 221 will be in alignment with the lug 226' and the lug 226' will be spring forced upwardly until it is above the face of the guard a distance equal to the thickness of the blade. In the meantime the old blade 221' has been forced into the chamber 333.

During this movement the lug 226 is maintained in depressed position by the members 313—313 of the magazine.

If now the holder be withdrawn, the insertion of the lug 226' into the opening of the blade, will maintain the blade upon the guard face and the old blade is removed from the razor and is deposited in the chamber 333. In this position the blade is held firmly in place upon the guard by the lugs 226—226'.

Figure 39:
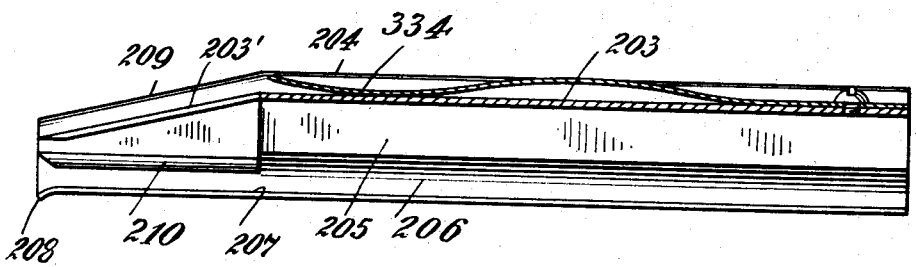
Figure 39 is a longitudinal section of a modified form of a blade magazine holder.

The modified form of a magazine shown in Figure 39 is similar to that previously described except that the chamber 333 has a spring 334 therein under which the removed blade will be deposited.

It will thus be seen that my invention presents a device into which a razor blade magazine may be so removably positioned as to allow a safety razor head to remove a single blade from said magazine by movements of said device over and in contact with said head.

I do not limit myself to the particular size, shape, number, arrangement or material of parts as shown and described as these are given solely for the purpose of clearly describing my invention.

What I claim is:

1. In a holder for a removable razor blade magazine, two side members having co-operating elements adapted to receive a razor blade magazine forming a unitary structure therewith, a forwardly extended member adapted to be inserted between the guard of a safety razor and a blade deposited thereon and means adapted to receive the guard of a razor head.

2. In a holder for a removable razor blade magazine, two side members, means connecting said side members, means adapted for the reception and removable retention of a blade magazine between the two said side members, a forwardly extended member adapted to be inserted between the guard of a safety razor and a blade deposited thereon and means adapted to receive the guard of a razor head.

3. In a holder for a removable razor blade magazine, a top member, two side members having co-operating means for the reception of a blade magazine, a forwardly extended member adapted to be inserted between the guard of a safety razor and a blade deposited thereon and means adapted to receive the guard of a razor head.

4. In a holder for a removable razor blade magazine, a top member having a centrally positioned recess therein, two side members having co-operating means for the reception of a blade magazine, a forwardly extended member adapted to be inserted between the guard of a safety razor and a blade deposited thereon and means adapted to receive the guard of a razor head.

5. In a holder for a removable razor blade magazine, a top member, two side members having co-operating runways adapted for the removable reception of a blade magazine, a forwardly extended member adapted to be inserted between the guard of a safety razor and a blade deposited thereon and means adapted to receive the guard of a razor head.

6. In a holder for a removable razor blade magazine, a top member having a centrally positioned recess therein, two side members having co-operating runways adapted for the removable reception of a blade magazine, a forwardly extended member adapted to be inserted between the guard of a safety razor and a blade deposited thereon and means adapted to receive the guard of a razor head.

7. In a holder for a removable razor blade magazine, a top member, two side members each having two interiorly faced superimposed runways co-operating to removably receive a blade magazine and to receive the guard of a razor head and a forwardly extended member adapted to be inserted between the guard of a safety razor and a blade positioned thereon.

8. In a holder for a removable razor blade magazine, a top member having a centrally positioned recess therein, two side members each having two interiorly faced superimposed runways co-operating to removably receive a blade magazine and to receive the guard of a razor head and a forwardly extended member adapted to be inserted between the guard of a safety razor and a blade positioned thereon.

9. In a holder for a removable razor blade magazine, a top member; two side members, each having an interiorly faced runway adapted to receive and support a blade magazine, and an interiorly faced runway adapted to receive the guard of a razor head and a forwardly extended member adapted to be inserted between the guard of a safety razor and a blade positioned thereon.

10. In a holder for a removable razor blade magazine, a top member having a centrally positioned recess therein; two side members, each having an interiorly faced runway adapted to receive and support a blade magazine, and an interiorly faced runway adapted to receive the guard of a razor head and a forwardly extended member adapted to be inserted between the guard of a safety razor and a blade positioned thereon.

11. In a holder for a removable razor blade magazine, a top member having a centrally positioned recess therein; two side members, each having an interiorly faced runway adapted to receive and support a blade magazine, an interiorly faced runway adapted to receive the guard of a razor a forwardly extended member adapted to be inserted between the guard of a safety razor and a blade positioned thereon and a bottom having an opening in alignment with said top member recess.

12. In a holder for a removable razor blade magazine, a top member; a plurality of blade removing members extending above said top member; two side members, each having two interiorly faced superimposed runways; a bottom member extending inwardly from each side member, said bottom members being spaced from each other, and a forwardly extended member adapted to be inserted between the guard of a safety razor and a blade positioned thereon.

13. In a holder for a removable razor blade magazine, a top member having a centrally positioned recess therein; a plurality of blade removing members extending above said top member; two side members, each having two interiorly faced superimposed runways; a bottom member extending inwardly from each side member, said bottom members being spaced from each other, and a forwardly extended member adapted to be inserted between the guard of a safety razor and a blade positioned thereon.

14. In a holder for a removable razor blade magazine, a top member having a centrally positioned recess therein, an end portion of each section of said top member forming said recess being inclined downwardly forming a reduced opening for the outward passage of a blade; two side members each having two interiorly faced superimposed runways.

15. In a holder for a removable razor blade magazine, a top member having a centrally positioned recess therein, an end portion of each section of said top member forming said recess being inclined downwardly forming a reduced opening for the outward passage of a blade; a plurality of blade removing members extending above said top member; two side members each having two interiorly faced superimposed runways.

16. In a holder for a removable razor blade magazine, a top member having a centrally positioned recess therein, an end portion of each section of said top member forming said recess being inclined downwardly forming a reduced opening for the outward passage of a blade; a plurality of blade removing members extending above said top member; two side members each having two interiorly faced superimposed runways; and a bottom member having an opening in alignment with said top member recess.

17. In a holder for a removable razor blade magazine, a top member having a centrally positioned recess therein, an end portion of each section of said top member forming said recess being inclined downwardly forming a reduced opening for the outward passage of a blade; a plurality of blade removing members extending above said top member; two side members extending slightly above said top member and each having two interiorly faced superimposed runways; and a bottom member extending inwardly from each side member, said bottom members being spaced from each other.

18. In a holder for a removable razor blade magazine, a top member having a centrally positioned recess therein, an end portion of each section of said top member forming said recess being inclined downwardly forming a reduced opening for the outward passage of a blade; a plurality of blade removing members extending above said top member; two side members extending slightly above said top member and each having two interiorly faced superimposed runways; and a bottom member having an opening in alignment with said top member recess.

19. In a holder for a removable razor blade magazine, two side members each having two corresponding runways, one corresponding set of said runways being adapted to receive a razor blade magazine forming a unitary structure therewith and the other corresponding set of said runways being adapted to receive the guard of a razor head and a forwardly extended member adapted to be inserted between the guard of a safety razor and a blade positioned thereon.

20. In a holder for a removable razor blade magazine, two side members each having two corresponding superimposed runways, one corresponding set of said runways being adapted to receive a razor blade magazine forming a unitary structure therewith and the other corresponding set of said runways being adapted to receive the guard of a razor head and a forwardly extended member adapted to be inserted between the guard of a safety razor and a blade positioned thereon.

SIDNEY H. BENJAMIN.